Feb. 25, 1964　　　C. J. SCRANTON　　　3,121,986
HARVESTER

Filed Aug. 29, 1960　　　　　　　　　　5 Sheets-Sheet 3

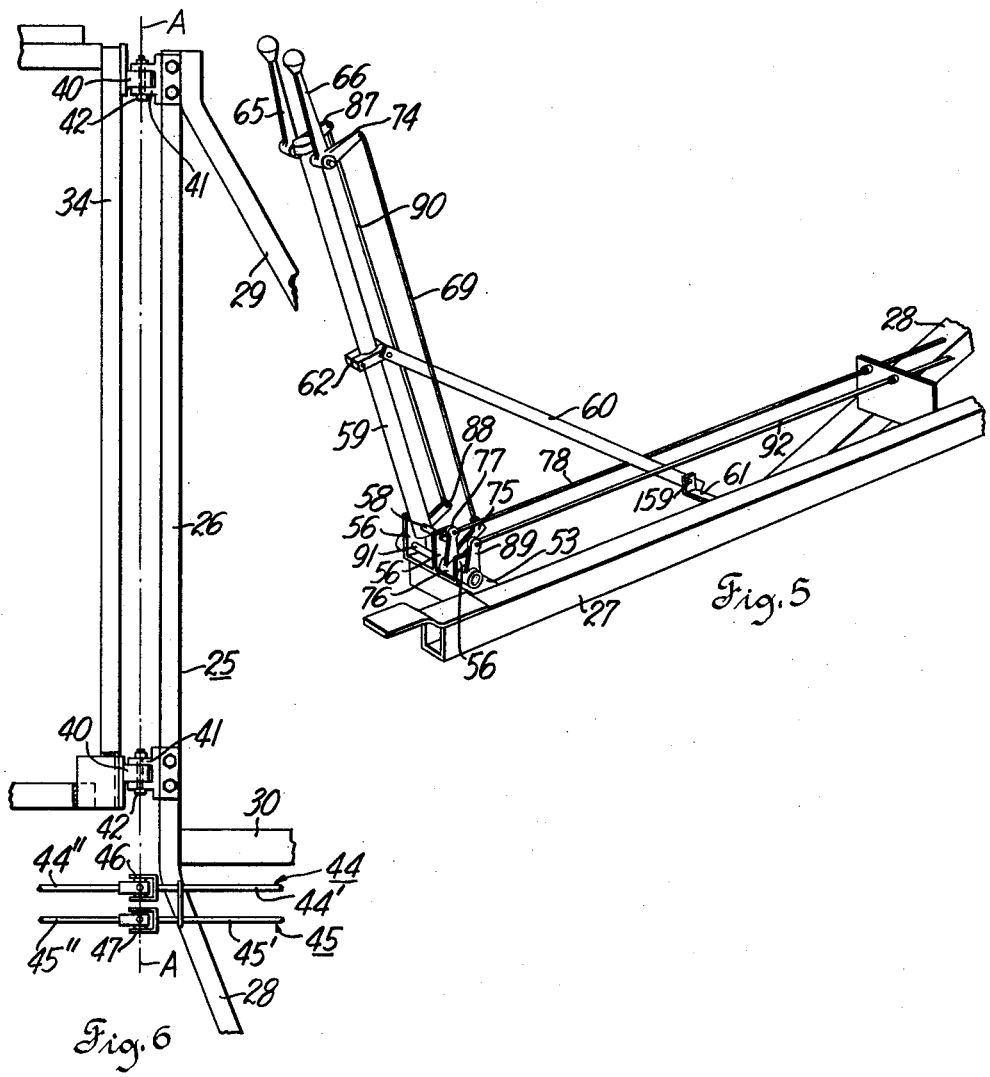

United States Patent Office 3,121,986
Patented Feb. 25, 1964

3,121,986
HARVESTER
Charles J. Scranton, La Porte, Ind., assignor to Allis-Chalmers Manufacturing Company, Milwaukee, Wis.
Filed Aug. 29, 1960, Ser. No. 52,590
6 Claims. (Cl. 56—218)

This invention relates to draft systems for drawn vehicles and more particularly to vehicles wherein it is necessary to have a wide machine during operation and a narrow machine for transport purposes.

In a pull-type combine harvester it is necessary for proper operation that the hitch connection be sufficiently transversely spaced with respect to the harvesting or header mechanism to avoid having the inside wheel of the drawing tractor travel over the uncut crop. This requirement is not compatible with the progressive increase in the width of cut that continuously takes place as larger machines are developed to match the increased power of larger tractors in an effort to make more productive use of a single operator's effort and increase the speed of the harvest. As the total width of the machine increases, problems arise with respect to transport of such machines along farm roads and lanes and effecting passage of the machine through farm gates of a size commonly encountered.

It is an object of this invention to provide a draft system for an agricultural harvesting machine that provides an operating hitch connection adequately transversely spaced from the crop receiving portion of the machine and a transport hitch connection that allows the machine and associated draft vehicle to pass over right of ways and through gates only slightly wider than the crop receiving portion.

It is a further object of this invention to provide a drawn machine that travels in the same direction during both operation and transport to thereby avoid the necessity of complex running gear.

It is a further object of this invention to provide a drawn machine having controls conveniently available to the operator of the draft vehicle when the machine is hitched to the draft vehicle by the operating hitch connection.

It is a further object of this invention to provide a draft system for a drawn vehicle that can be converted from an operating connection to a transport connection and vice versa by a single operator.

Referring to the drawings:

FIG. 5 shows the grain bin and separator control lever structure mounted on a forward portion of the draft frame;

FIG. 6 shows the hinge connection between the draft frame and the combine frame and the universal connections of the control rods which pivot on the same axis.

Figure 1:
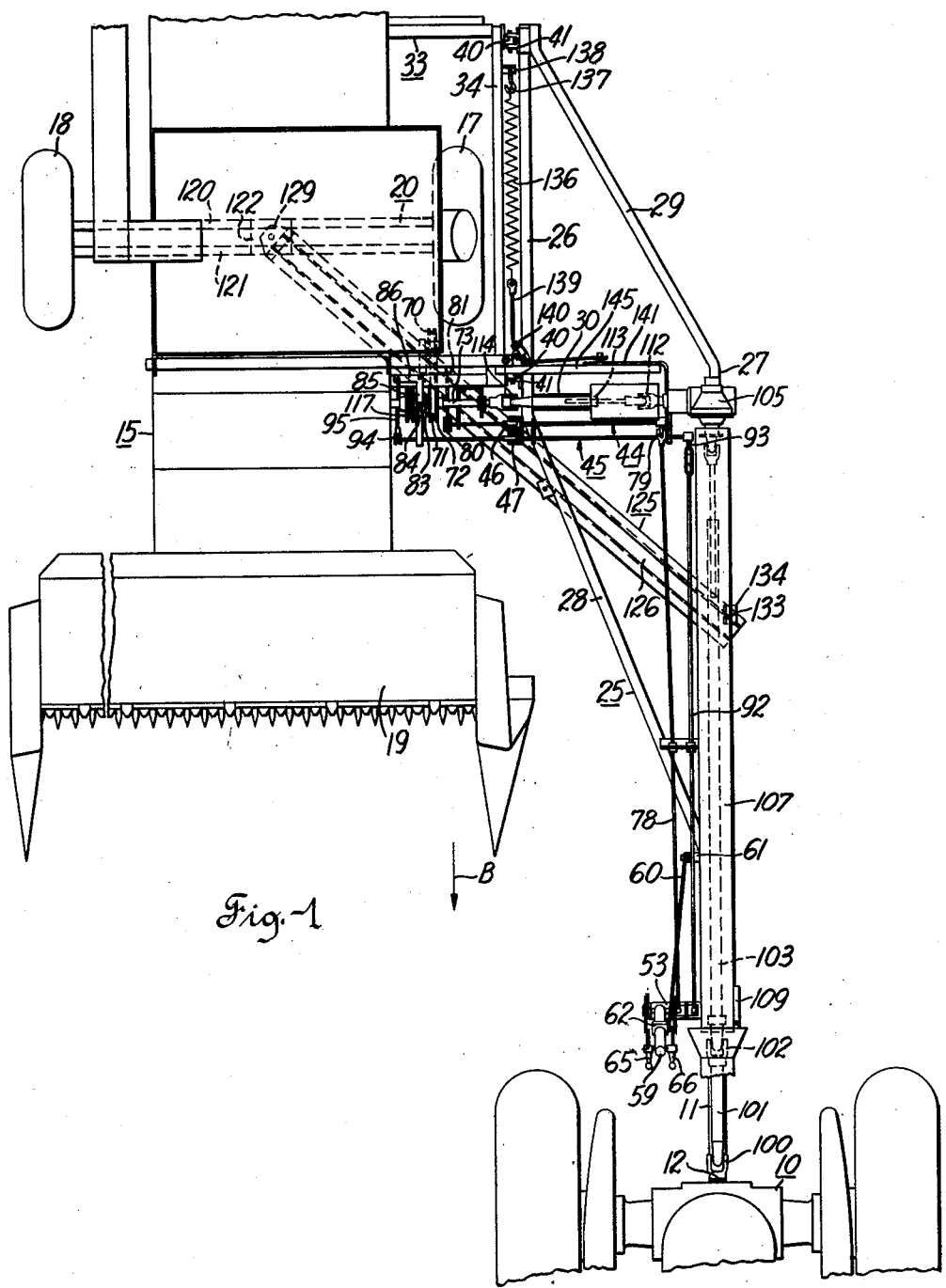
FIG. 1 is a plan view of a combine and a propelling tractor, with portions of each machine broken away, showing the draft system of this invention in the operating position.

Referring to the drawings, FIG. 1 shows a rear portion of a conventional tractor 10 having a drawbar 11 and a power take-off connection 12. A pull-type combine harvester 15 is shown behind the tractor, hitched in an operating condition with the direction of travel indicated by the arrow B. The combine is of a conventional design with a forwardly facing header or crop collecting portion 19, which is interrupted for purposes of illustration, with the thresher-separator portion, partially broken away, extending rearward. The combine is supported on two ground engaging wheels 17 and 18 which are connected to an axle support frame assembly 20 (shown in phantom view). The thresher and separator housing is supported by a frame structure 33 which has a portion 34 extending transversely beyond and about the ground engaging wheel 17.

When the combine is in its operating condition the tractor is connected to a draft frame 25 of substantially horizontal orientation which has two longitudinally extending members 26 and 27 with a portion of each bent at an angle to respectively provide diagonally disposed frame portions 28 and 29. These two members, 26 and 27, are welded together and with the added support afforded by the cross support member 30 which is welded by end portions to members 26 and 27, respectively, comprise a draft frame 25 which is pivotally connected to the combine frame portion 34. This pivotal connection can best be seen in FIG. 6 wherein the tongue hinge portions 40 mounted on frame member 34 and the fork hinge portions 41 mounted on draft frame 25 are interconnected by the pins 42 for pivoting of the draft frame with respect to the combine frame 33 about the axis AA. Also indicated, FIG. 6, are control rods 44 and 45 which are each provided with a respective intermediate universal joint 46 and 47 which is so positioned as to pivot on the axis AA established by the hinge connection between the combine frame portion 34 and the draft frame 25. This relationship makes disconnection of the control rods unnecessary when the draft frame is pivoted with respect to the combine frame. At the forward end of the draft frame is a socket connection 49 (FIG. 3) which connects to a cooperating ball portion 50 mounted on the tractor drawbar 11 to form a ball and socket hitch connection of conventional design which forms no part of the present invention and will not be further described. This hitch connection is transversely spaced from the vehicle frame 33 and located forwardly of both the vehicle frame and header portion 19.

On the forward portion of the draft frame, that is on the longitudinal member 27 (FIG. 5), is mounted a control assembly for operating the separator and grain bin mechanisms. A transverse tube 53 welded to the longitudinal member 27 supports a bracket having upwardly extending portions 56. A control post pivot 58, welded to the control post 59, is journaled through openings in the bracket assembly to pivotally connect the control post thereto. The control post 59 is maintained in a fixed position by the support brace 60 which is bolted at one end to a bracket 61 welded to the longitudinal member 27 and at the opposite end is bolted to the control post anchor 62.

Pivotally connected at either side of an upper portion of the control post are actuating control levers 65 and 66. The bin control is effected by pivoting a belt tensioning idler pulley 70 into and out of engagement with a belt 71 (only partially shown) which in the tensioned position establishes a driving relation between the drive sheave 72 mounted on the drive shaft 73 and a grain bin driven sheave (not shown). This control is effected by movement of the control lever 66 which pivots the associated crank arm 74. This motion is transmitted to the crank arm 75 of the bell crank 76 by the rod 69 causing the crank arm 77 to actuate the rod 78 which in turn pivots the crank arm 79 (FIG. 1) on rod 44. The rod 44 has the intermediate universal coupling 46 between portions 44′ and 44″ thereof which are supported by the draft frame 25 and the vehicle frame 33, respectively. Rigidly connected to the opposite ends of the articulated rod 44 are the crank arms 79 and 80, respectively. Pivoting the crank arm 80 causes a rod 81 to pivot the belt tensioning idler pulley 70.

The separator drive mechanism is engaged and disengaged by movement of a movable driving clutch portion 83 into and out of engagement with a coaxial driven clutch portion 84. Back and forth axial movement of the clutch portion 83 is effected by horizontal back and forth swinging movement of arm 85 of a bell crank 86. Pivoting the control lever 65 causes the arm 87 to rock the arm 88 through the medium of the interconnecting rod 90. Crank arms 88 and 89 are fixedly connected to the shaft 91 to form a bell crank which transmits motion through rod 92 to the crank arm 93 (FIG. 1). Crank arms 93 and 94 are rigidly connected to the articulated rod 45 which also has the intermediate universal joint 46 between sections 45′ and 45″ thereof. Pivoting of crank arm 94 on rod section 45″ causes a link 95 to pivot the bell crank 86.

Figure 2:
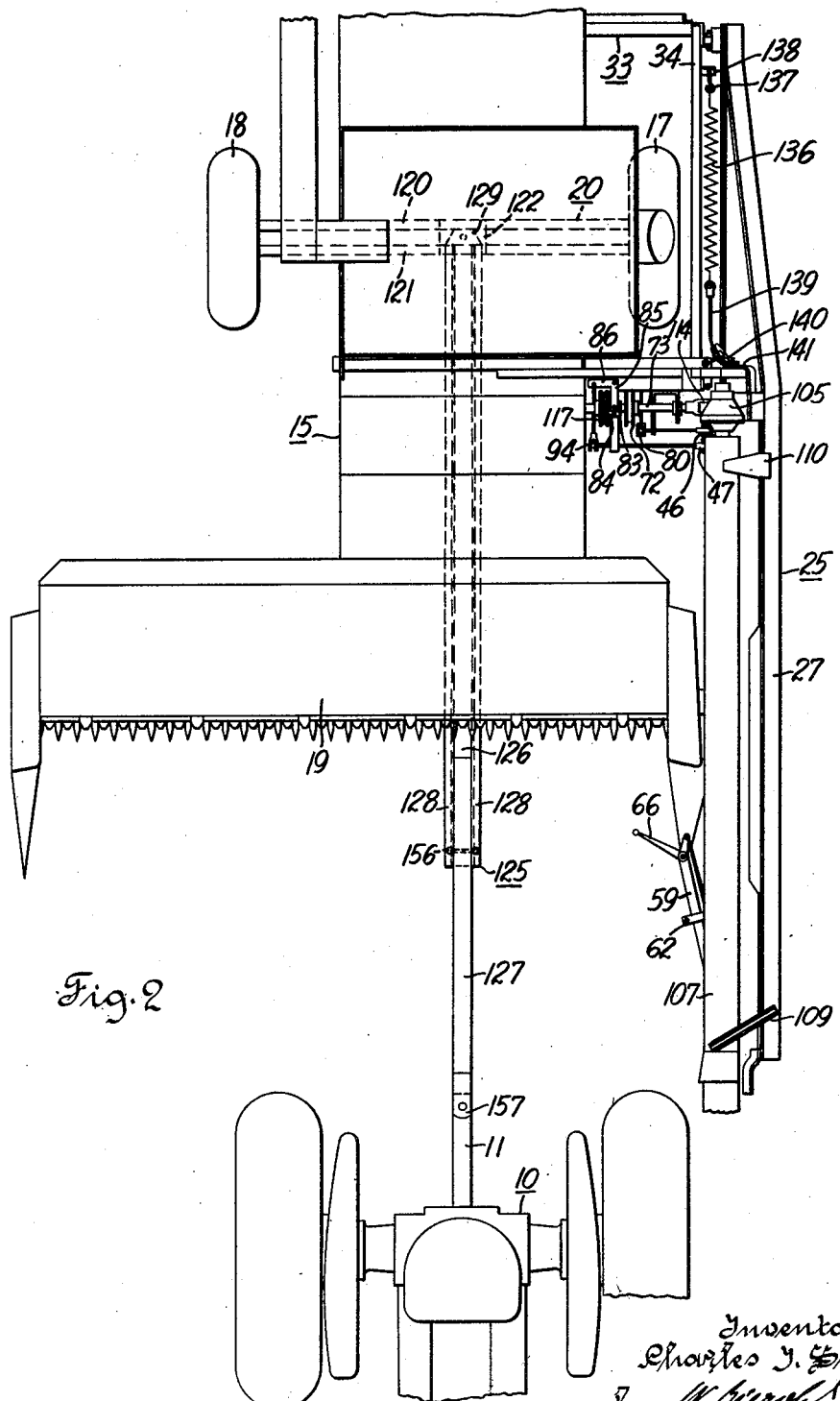
FIG. 2 shows the plan view of the combine and propelling tractor shown in FIG. 1 with the draft system in the transport condition.

Power is transmitted to the combine from the tractor power take-off connection 12 which is connected through the universal joint 100 to the short propeller shaft 101 which connects through a second universal joint 102 with the telescopic shafting 103, which shafting is supported on the draft frame 25. The telescopic shafting 103 connects at its rearward portion to the gear box 105 on draft frame 25. The shafting and the shielding 107 in which it is housed extend from the tractor power take-off 12 to the gear box 105 (a forward portion of the shield being broken away in FIG. 1) and are supported intermediately above the longitudinal member 27 of the draft frame 25 by forward brackets 109 (FIG. 3) and a rearward upstanding bracket portion 110. From the gear box power is transmitted successively through a universal joint 112, telescopic shafting 113 and a universal joint 114 to the shaft 73 on which is mounted the bin drive sheave 72. The shaft 73 is connected through the separator clutch 83, 84 to the drive sheave 117 which, in turn, is connected (by conventional means not shown) to the threshing cylinder, separator mechanism and the header mechanism (not shown). The universal joint 114 of the main drive (FIG. 1) is positioned above the axis AA established by the hinges 40, 41 and it is therefore necessary to provide for telescopic movement of the shafting 113 to accommodate the change in the length of this shafting section as the draft frame 25 is pivoted about the hinged axis AA, to the raised position in which it is shown in FIGS. 2 and 4.

Figure 3:
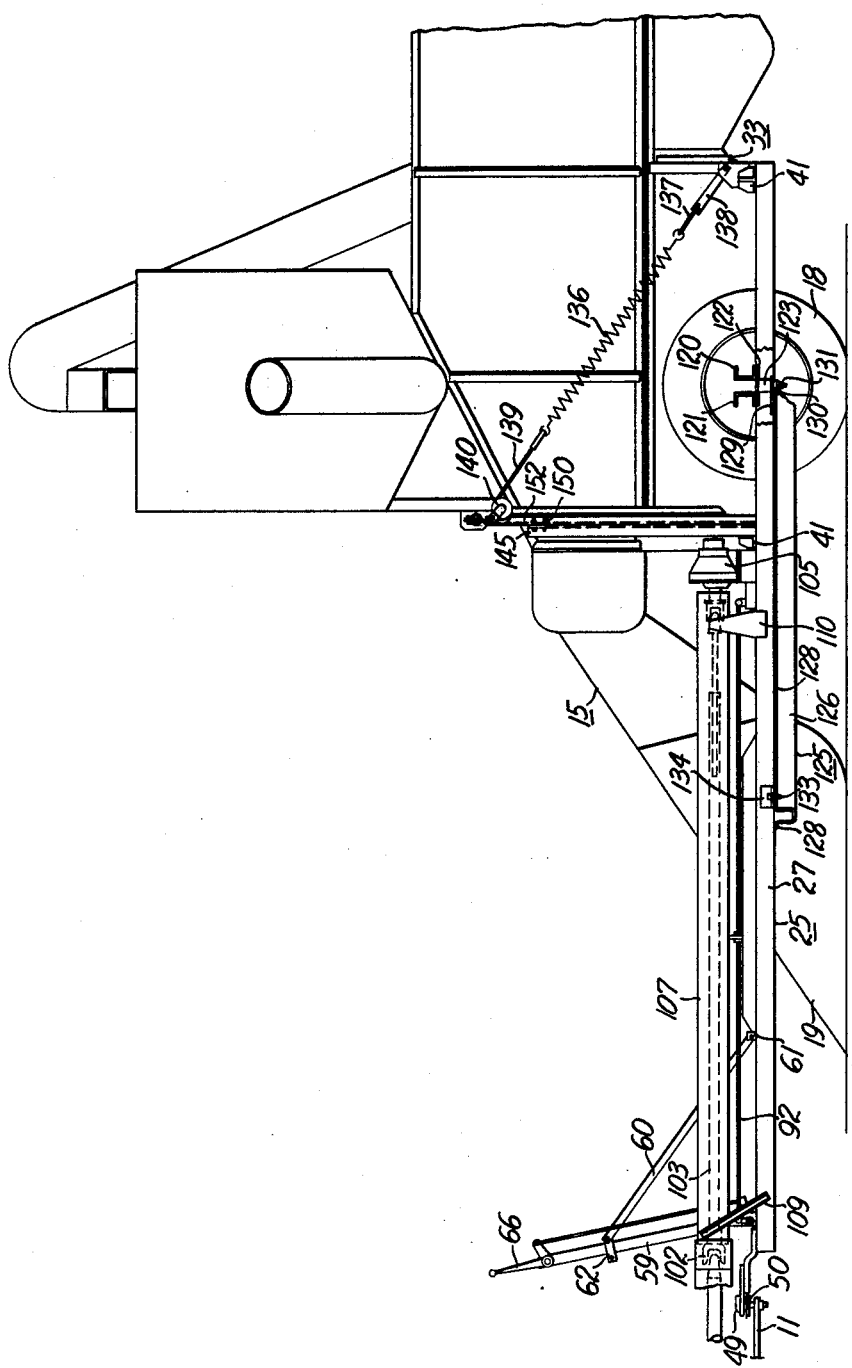
FIG. 3 shows a left side elevation of the combine of FIGS. 1 and 2 with the left wheel removed; portions of the combine frame, power shafting and transport tongue broken away and includes a portion of the tractor drawbar.

Referring to FIGS. 1 and 3, a pair of cross channel members 120 and 121 form a part of the axle support assembly 20 including a connecting plate 122. Welded to the plate 122 is a pivot 123 which extends downward on a vertical axis. A transport tongue 125, shown in FIG. 1, comprises a channel member 126 (FIG. 3) with outwardly extending flange portions 128. A plate 129 is bolted to the rear end portion of the channel member 126 as seen in FIG. 3 and it is this plate 129 which has an opening that receives and is journaled about the bearing portion of the pivot 123. A washer 130 and nut 131 secure the plate 129 to the pivot 123. The pivot 123 is welded to the cross plate 122.

For harvesting operations, with the draft frame 25 extending horizontally outward from the vehicle frame 33, the transport tongue 125 is swung to the position shown in FIG. 1 and is secured by bolt 133 to a tab 134 which tab is welded to the draft frame 25. A counterbalancing spring 136 is connected to the combine frame by a hook 137 and bracket 138 at one of its ends and the other end of the spring is connected to a cable 139 which passes over a guide sheave 140 mounted on an extending portion of the combine frame structure 33 with the opposite end of the cable 139 secured to a bracket 141 (FIG. 1) which is mounted on a portion of the draft frame cross support structure 30.

Figure 4:
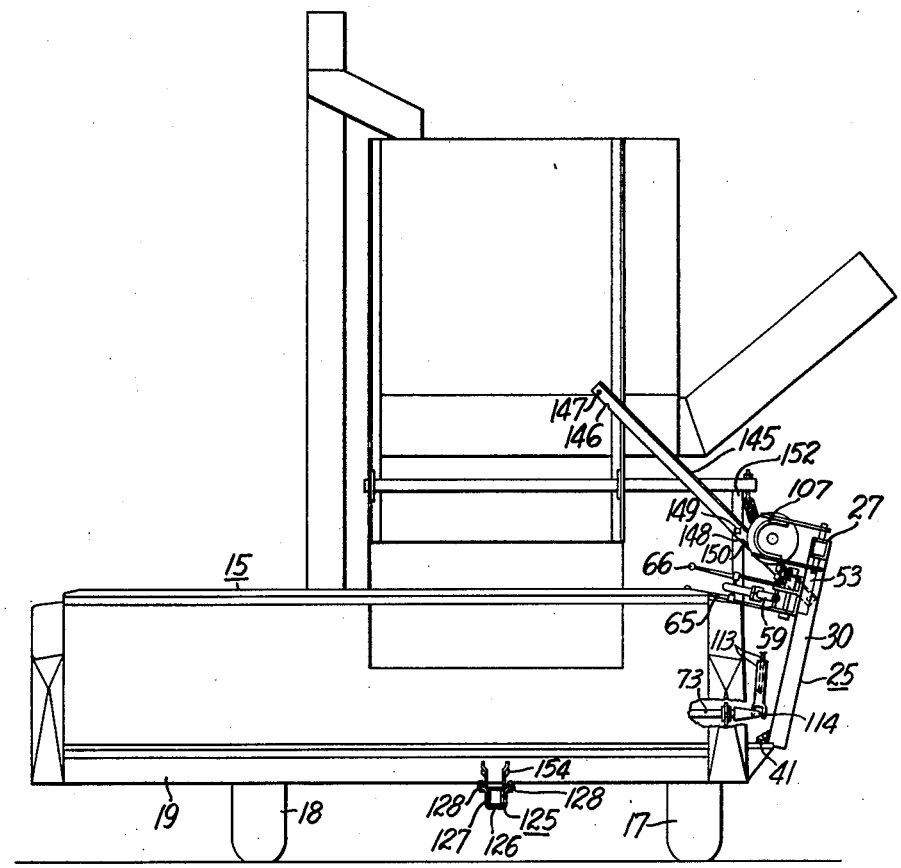
FIG. 4 shows the draft system in a transport condition with forward portions of the draft tongue and the draft frame structure broken away from purposes of illustration and portions of the drive and control devices excluded.

In FIG. 4 can be seen a support member 145 which is pivotally connected to the cross support structure 30 of the draft frame 25 at one end and has at the other end portion a notch 146 and aperture 147. Intermediate the ends is a similar notch 148 and aperture (through which bolt 149 extends) whereby the draft frame 25, as shown in this view, is supported in its upwardly pivoted position. Welded to the vertical support 152 at one side of the frame 33 is a pin 150 which is received in the support member notch 148 to retain the draft frame 25 in the upwardly pivoted transport position. While the notch 148 and the pin 150 are engaged, the support member is secured against accidental withdrawal of the pin from the notch by bolt 149 which extends through the support member 145 and the vertical support 152. The notch 146 and aperture 147 at the end portion of the support member 145 function in the identical manner to maintain the draft frame 25 in the downwardly pivoted operating or harvesting position.

When it is desired to transport the combine, the transport tongue 125 is pivoted to the longitudinally extending position shown in FIG. 2. It is maintained in this position by being bolted to a bracket 154 (FIG. 4) on the bottom side of the header or crop collecting portion 19. Inserted in the channel 126 is a telescoping tongue member 127 which extends the transport tongue forward and has at its forward end a hinge plate and block structure which form a socket connecting connecting portion 157 similar to the socket member 49 at the forward end of the draft frame 25 which attaches to the ball-hitch portion 50 on the tractor drawbar 11. This telescoping forward transport tongue member 127 is maintained in position by the bolt 156 (FIG. 2). Referring to FIGS. 2 and 4, it can be seen that in the transport position the draft frame 25 is upwardly pivoted about the hinge axis AA which is offset transversely outward only a short distance beyond the end of the header structure 19. Further, the location of the tractor 10 (FIG. 2) is directly ahead of the combine 15 so as to add practically nothing to the width presented during transport of the combine.

To change the position of the draft frame 25 from that of harvesting or field operation to transport it is necessary only to disconnect the bolt 159, which connects the support member 60 to the bracket 61 to maintain the control support tube 59 in its upstanding operating position, and fold the tube 59 back to a position adjacent the power shafting 103; disconnect the bolt 133 which secures the transport tongue 125 to the draft frame 25; disconnect the power shafting universal 100 from the power take-off 12; and remove the bolt from the diagonal support member 145 and disengage the pin 150 from the notch 146. The draft frame 25 is then free to be pivoted upwardly about the hinge axis AA, which action is assisted by the counterbalance spring 136, and to be secured in the transport position. To prepare the combine for transport, the transport tongue 125 is secured to the bracket 154 beneath the combine header 19. Thereafter, the telescoping transport tongue portion 127 is inserted within the channel of the transport tongue portion 126 and the bolt 156 secures the two transport tongue portions together. A reversal of the above procedure will return the draft system from the transport condition to the operating or harvesting condition.

In general terms, the frame 33 of the herein disclosed combine harvester represents a wheeled or wheel supported vehicle frame of an agricultural machine, and horizontal pivot means as shown at 40, 41 and 42 in FIG. 6, and vertical pivot means as shown at 129 in FIG. 2, are mounted on said vehicle frame; the horizontal pivot means presenting a horizontal hinge axis AA (FIG. 6) adjacent one side of the vehicle frame, and the vertical pivot means presenting a pivot axis in radially spaced relation to said hinge axis. The draft frame 25 is swingably connected with the vehicle frame 33 by the horizontal pivot means 40, 41, 42, and has a hitch portion, as indicated at 11 in FIG. 1, in radially spaced relation to said hinge axis. The transport tongue member 126 represents an elongated, rigid member which is swingably connected with the vehicle frame by the vertical pivot means 129 for horizontal pivotal movement to angled and nonangled positions, respectively, relative to the direction of travel of the machine; the angled position being illustrated by FIG. 1 and the nonangled position being illustrated by FIG. 2. Releasable fastening means for connecting the rigid member 126 in its angled position to the draft frame 25 are illustrated at 133, 134 in FIG. 1. The bracket 154 and associated bolts shown in FIG. 4 represent separable fastening means associated, respectively, with the vehicle frame and the elongated member 126 for securing the latter against horizontal angular displacement from its nonangled position in which it is shown in FIG. 2.

It should be understood that it is not intended to limit the invention to the exact forms and details herein described, and that the invention includes such other forms and modifications as are embraced by the scope of the appended claims.

What is claimed is:

1. An agricultural machine comprising a wheeled vehicle frame, a draft frame extending in the direction of travel of said vehicle frame along one side of the latter; pivot means at said one side of said vehicle frame having a longitudinal axis extending in said direction of travel and connecting said draft frame with said vehicle frame for pivotal back and forth movement between a substantially horizontal operating position in laterally outward extending relation to said vehicle frame and an upwardly pivoted transport position, said draft frame presenting an operative hitching portion ahead of and transversely spaced from said vehicle frame in said operating position; a rigid, elongated support member pivotally connected to said vehicle frame on a vertical axis for swinging movement to horizontally angled and nonangled positions, respectively, relative to said longitudinal axis; and releasable fastening means for detachably connecting said support member in said angled position thereof with said draft frame upon adjustment of the latter to said operating position.

2. In an agricultural machine having a vehicle frame, a draft system comprising: a draft frame connected to said vehicle frame on a longitudinal axis extending in the direction of travel for pivotal movement between a substantially horizontal operating position and an upwardly pivoted transport position; a transport draft member pivotally connected to said vehicle frame about a vertical axis for pivotal movement to horizontally angled and nonangled positions, respectively, relative to said longitudinal axis; and releasable fastening means securing said transport draft member in said horizontally angled position thereof to said draft frame.

3. In an agricultural machine having a vehicle frame mounted on transversely spaced ground engaging wheels and supporting a forwardly facing crop collecting portion, a draft system comprising: a draft frame pivotally connected to said vehicle frame on a longitudinal axis extending in the direction of travel, and adjacent one transverse side of said crop collecting portion, said draft frame presenting an operative hitch connection when in a substantially horizontal operating position which is forward of and transversely spaced from both said vehicle frame and said crop collecting portion, said draft frame having an upwardly pivoted transport position; retaining means selectively engageable to retain said draft frame in said operating or said transport position; a transport tongue member having a rearward portion pivotally connected with said vehicle frame on a vertical axis rearwardly of said crop collecting portion and being swingable about said vertical axis to horizontally angled and nonangled positions, respectively, relative to said longitudinal axis; and releasable fastening means detachably securing said tongue member in said horizontally angled position thereof to said draft frame in said operating position of the latter.

4. In an agricultural machine having a vehicle frame supported by a pair of transversely spaced ground engaging wheels mounted about a common transverse axis and a forwardly facing crop receiving portion, a draft system comprising: a draft frame pivotally connected to said vehicle frame at one side thereof about a longitudinal axis extending in the direction of travel with both of said wheels disposed on the same transverse side of said longitudinal axis, said draft frame having a first substantially horizontal operating position wherein a hitch connection is presented by said draft frame that is forward of and transversely spaced from both said vehicle frame and said crop engaging portion and a second upwardly pivoted transport position; releasable retaining means interconnecting said frames for selectively retaining said draft frame in said first or second position; a transport tongue member having a vertical pivot connection with said vehicle frame rearwardly of said crop receiving portion and substantially midway between said wheels, said tongue member being swingable about said vertical pivot connection to horizontally angled and nonangled positions, respectively, relative to said longitudinal axis and having a length so as to extend forwardly under and beyond said crop receiving portion when swung to said nonangled position; and releasable fastening means detachably securing said tongue member in said horizontally angled position thereof to said draft frame in said operating position of the latter.

5. An agricultural machine comprising: a wheel supported vehicle frame; horizontal and vertical pivot means mounted on said vehicle frame and presenting, respectively, a horizontal hinge axis adjacent one side of said vehicle frame, and a vertical pivot axis in radially spaced relation to said hinge axis; a draft frame swingably connected with said vehicle frame by said horizontal pivot means and having a hitch portion in radially spaced relation to said hinge axis; an elongated, regid member swingably connected with said vehicle frame by said vertical pivot means for horizontal pivotal movement to angled and nonangled positions, respectively, relative to the direction of travel of the machine; and releasable fastening means for connecting said rigid member in said angled position thereof to said draft frame.

6. A machine as set forth in claim 5 and further comprising separable fastening means associated, respectively, with said vehicle frame and elongated member for securing the latter against horizontal angular displacement from said nonangled position thereof.

References Cited in the file of this patent

UNITED STATES PATENTS

| | | |
|---|---|---|
| 1,941,670 | Everett | Jan. 2, 1934 |
| 2,512,097 | Goodspeed | June 20, 1950 |
| 2,675,248 | McDermott | Apr. 13, 1954 |
| 2,697,617 | Sudenga | Dec. 21, 1954 |
| 2,809,574 | Hill et al | Oct. 12, 1957 |

FOREIGN PATENTS

| | | |
|---|---|---|
| 87,347 | Denmark | May 25, 1959 |
| 93,136 | Norway | Dec. 29, 1958 |